(12) United States Patent
Sakoda et al.

(10) Patent No.: US 11,477,860 B2
(45) Date of Patent: Oct. 18, 2022

(54) INDUCTION HEATING APPARATUS AND INDUCTION HEATING METHOD OF PLATE-LIKE MEMBER

(71) Applicant: TOYOTA JIDOSHA KABUSHIKI KAISHA, Toyota (JP)

(72) Inventors: Naoki Sakoda, Nagoya (JP); Shinya Yamamoto, Toyota (JP); Masatomo Niihara, Okazaki (JP); Satoshi Yamazaki, Nagoya (JP); Shinobu Okuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 413 days.

(21) Appl. No.: 16/701,518

(22) Filed: Dec. 3, 2019

(65) Prior Publication Data
US 2020/0245414 A1 Jul. 30, 2020

(30) Foreign Application Priority Data
Jan. 25, 2019 (JP) .............................. JP2019-011057

(51) Int. Cl.
*H05B 6/06* (2006.01)
*H05B 6/44* (2006.01)

(52) U.S. Cl.
CPC .............. *H05B 6/062* (2013.01); *H05B 6/44* (2013.01); *H05B 2213/07* (2013.01)

(58) Field of Classification Search
CPC ....... H05B 2213/07; H05B 6/062; H05B 6/44
See application file for complete search history.

(56) References Cited

U.S. PATENT DOCUMENTS

2011/0315281 A1* 12/2011 Charest .................... C21D 8/00
148/714

FOREIGN PATENT DOCUMENTS

| JP | 62-117292 A | | 5/1987 |
|---|---|---|---|
| JP | 2007122924 A | * | 5/2007 |
| JP | 2012-144773 A | | 8/2012 |
| JP | 2012144773 A | * | 8/2012 |

(Continued)

OTHER PUBLICATIONS

"Shimazu, Induction Heating Device, 2007" (Year: 2007).*
(Continued)

*Primary Examiner* — Brian W Jennison
*Assistant Examiner* — Abigail H Rhue
(74) *Attorney, Agent, or Firm* — Oblon, McClelland, Maier & Neustadt, L.L.P.

(57) ABSTRACT

An induction heating apparatus of a plate-like member for arranging a plate-like member having a three-dimensional structure so that it is interposed between a pair of plate-like coils and inductively heating the plate-like member, the pair of plate-like coils having a three-dimensional structure that corresponds to the plate-like member and being arranged to be opposed to each other. The plate-like member arranged between the pair of plate-like coils includes a plurality of surfaces in a predetermined cross section perpendicular to a current that flows through the plate-like coil pair, and each of the coils of the plate-like coil pair is divided into a plurality of turns along the direction in which the current flows for at least each of the plurality of surfaces of the plate-like member.

3 Claims, 12 Drawing Sheets

(56) References Cited

FOREIGN PATENT DOCUMENTS

JP 2018-45908 A 3/2018

OTHER PUBLICATIONS

"Kato, Metal Plate for Radiation Transfer Heating and Method for Producing the Same, and Metal Worked Product With Different Strength Parts and Method for Producing the Same, 2012" (Year: 2012).*

* cited by examiner

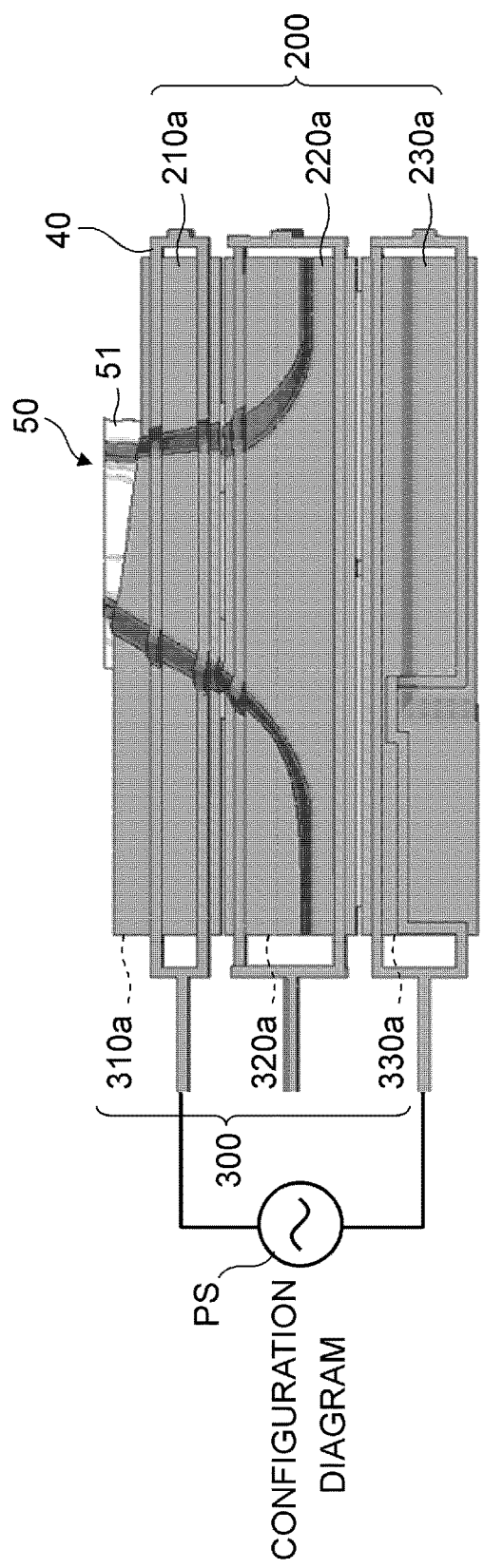
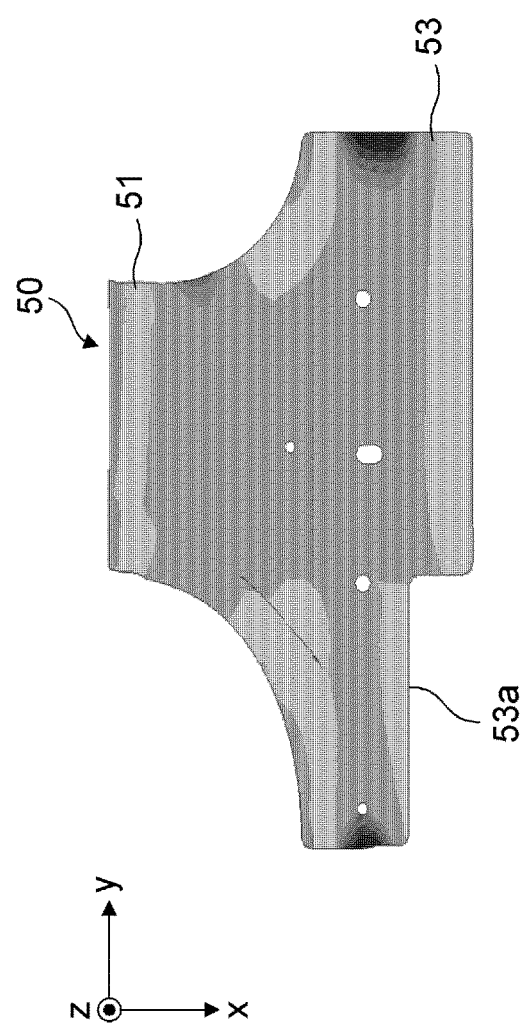
Fig. 8

INDUCTION HEATING APPARATUS AND INDUCTION HEATING METHOD OF PLATE-LIKE MEMBER

CROSS REFERENCE TO RELATED APPLICATIONS

This application is based upon and claims the benefit of priority from Japanese patent application No. 2019-011057, filed on Jan. 25, 2019, the disclosure of which is incorporated herein in its entirety by reference.

BACKGROUND

The present disclosure relates to an induction heating apparatus and an induction heating method of a plate-like member, and relates to, in particular, an induction heating apparatus and an induction heating method of a plate-like member for arranging a plate-like member having a three-dimensional structure in such a way that it is interposed between a pair of plate-like coils arranged to be opposed to each other and inductively heating the plate-like member.

In recent years, steel plate members (i.e., plate-like members) including a hard region resistant to an impact and a soft region for absorbing an impact have been developed, for example, as structural members for automobiles in order to improve impact resistance characteristics. Japanese Unexamined Patent Application Publication No. 2012-144773 discloses a technique of forming a hard region and a soft region in one plate-like member by locally heating only a region of the plate-like member to a temperature higher than an austenite transformation finish temperature A3 and quenching the heated region.

Alternatively, after forming a hard region in the entire plate-like member by quenching, only a region of the plate-like member may be heated and tempered, thereby forming the hard region and the soft region in one plate-like member.

SUMMARY

The present inventors have studied a method of arranging a plate-like member having a three-dimensional structure between a pair of plate-like coils arranged to be opposed to each other and inductively heating this plate-like member as a method of heating the plate-like member, and have found the following problem.

The problem will be explained with reference to FIGS. 10-12. FIG. 10 is a perspective view showing one example of a plate-like member. FIG. 11 is a perspective view of a plate-like coil pair which describes the problem solved by the present disclosure. FIG. 12 is a perspective view of an induction heating apparatus which describes the problem solved by the present disclosure.

As shown in FIG. 10, a plate-like member 10 to be heated, which is, for example, a lower part of a center pillar reinforcement of an automobile, includes a body part 11 and a lower flange part 13. The alternate long and short dash line shown in FIG. 10 is a boundary line between the body part 11 and the lower flange part 13 that is defined to simplify the explanation. In a state in which the plate-like member 10 is attached to the automobile, the x-axis positive direction side is a lower side and the x-axis negative direction side is an upper side.

As shown in FIG. 10, the body part 11 is a part having a hat-shaped cross-section and includes a top plate 111 extending in the x-axis direction, a pair of side walls 112, and flange parts 113. The pair of side walls 112 are formed in the z-axis negative direction from the respective ends in the width direction (y direction) of the top plate 111 extending in the x-axis direction. Further, the flange parts 113 project outwardly from the ends of the respective side walls 112.

The lower flange part 13 is a flat plate-shaped part projecting from the end in the x-axis positive direction side of the top plate 111 outwardly in the length direction and extending in the width direction (y-axis direction). The side walls 112 and the flange parts 113 of the body part 11 are extended in the y-axis direction along the lower flange part 13 from the ends of the top plate 111. That is, the side walls 112 and the flange parts 113 of the body part 11 are L-shaped in an xy plan view.

Note that the shape of the plate-like member 10 shown in FIG. 10 is merely one example, and the shape of the plate-like member having a three-dimensional structure to be inductively heated is not limited to this example. Further, the right-handed xyz Cartesian coordinate system shown in FIG. 10 and other drawings is the one defined to simplify the explanation of the positional relationship among the constituting elements. In general, the z-axis positive direction corresponds to the vertically upward direction and the xy-plane forms a horizontal plane.

As shown in FIG. 11, the plate-like coil pair which describes the problem is formed of, for example, two plate-like coils (an upper plate-like coil 200 and a lower plate-like coil 300) having a three-dimensional structure that corresponds to the plate-like member 10. FIG. 11 indicates the plate-like member 10 that is inductively heated by alternate long and two short dashes lines.

The upper plate-like coil 200 includes a hat-shaped part 210 that corresponds to the body part 11 of the plate-like member 10, a connection wall 220 that connects the hat-shaped part 210 with the flat plate part 230, and a flat plate part 230 that corresponds to the lower flange part 13 of the plate-like member 10. The alternate long and short dash line shown in each of FIGS. 11 and 12 is a boundary line between the hat-shaped part 210 and the flat plate part 230 that is defined to simplify the explanation. The hat-shaped part 210 is a part having a hat-shaped cross-section and includes a top plate 211 that corresponds to the top plate 111, side walls 212 that correspond to the side walls 112, and bottom plates 213 that correspond to the flange parts 113. The connection wall 220 connects the bottom plate 213 of the hat-shaped part 210 and the flat plate part 230.

In a similar way, the lower plate-like coil 300 includes a hat-shaped part 310 that corresponds to the body part 11 of the plate-like member 10, a connection wall 320 that connects the hat-shaped part 310 and the flat plate part 330, and a flat plate part 330 that corresponds to the lower flange part 13 of the plate-like member 10. The hat-shaped part 310 is a part having a hat-shaped cross-section and includes a top plate 311 that corresponds to the top plate 111, side walls 312 that correspond to the side walls 112, and bottom plates 313 that correspond to the flange parts 113. The connection wall 320 connects the bottom plate 313 of the hat-shaped part 310 with the flat plate part 330.

As shown in FIG. 12, in the induction heating apparatus which describes the problem, the tubular coil 40 is joined to the plate-like coil pair (the upper plate-like coil 200 and the lower plate-like coil 300) shown in FIG. 11, and is provided to make one turn outside the plate-like coil pair. The respective ends of the tubular coil 40 are connected to a high frequency power supply PS, which forms an open circuit as a whole. The tubular coil 40 shown in FIG. 12 is divided into two coils on the upper surface of the upper plate-like coil 200 and the lower surface of the lower plate-like coil 300 and is extended in the y-axis direction.

As shown in FIG. 12, in the upper plate-like coil 200 and the lower plate-like coil 300, the cross-sectional length that is parallel to the current that flows in the y-axis direction varies depending on the position of the x-axis direction. For example, since the cross-sectional length of the hat-shaped parts 210 and 310 is longer than that of the flat plate parts 230 and 330, resistance in the hat-shaped parts 210 and 310 becomes larger than that in the flat plate parts 230 and 330. Therefore, there is a problem that, as shown in FIG. 12, currents concentrate in a region in which the resistance is small (e.g., the flat plate parts 230 and 330) in each of the upper plate-like coil 200 and the lower plate-like coil 300, whereby the plate-like member 10 cannot be heated uniformly.

The present disclosure has been made in view of the aforementioned circumstances and provides an induction heating apparatus and an induction heating method of a plate-like member capable of heating a plate-like member uniformly.

An induction heating apparatus of a plate-like member according to one aspect of the present disclosure is an induction heating apparatus of a plate-like member for arranging a plate-like member having a three-dimensional structure in such a way that it is interposed between a pair of plate-like coils and inductively heating the plate-like member, the pair of plate-like coils having a three-dimensional structure that corresponds to the plate-like member and being arranged to be opposed to each other, in which the plate-like member arranged between the pair of plate-like coils includes a plurality of surfaces in a predetermined cross section that is perpendicular to a current that flows through the plate-like coil pair, and each of the coils of the plate-like coil pair is divided into a plurality of turns along the direction in which the current flows for at least each of the plurality of surfaces of the plate-like member.

In the induction heating apparatus of the plate-like member according to one aspect of the present disclosure, the plate-like member arranged between the pair of plate-like coils includes the plurality of surfaces in the predetermined cross section that is perpendicular to the current that flows through the plate-like coil pair, and each of the coils of the plate-like coil pair is divided into a plurality of turns along the direction in which the current flows for at least each of the plurality of surfaces of the plate-like member. Therefore, the currents that flow through each of the coils of the divided plate-like coil pair can be made equal to each other, whereby it is possible to uniformly heat the plate-like member.

The plate-like coil pair may be formed in such a way that the outer form thereof overlaps that of the plate-like member in a plan view. The plate-like member is arranged in the whole part between the pair of plate-like coils, whereby the plate-like member can be heated uniformly.

The induction heating apparatus of the plate-like member may further include a tubular coil that is joined to respective outer surfaces of the divided plate-like coil pair and connects the divided plate-like coil pair in series. The tubular coil may be joined to at least one of the plate-like coils that form the divided plate-like coil pair in such a manner that the tubular coil is divided into first and second branch parts. The length of the part joined to the plate-like coil in the first branch part may be shorter than that in the second branch part, and the length of the part that is protruded from the plate-like coil in the first branch part may be longer than that in the second branch part. According to this configuration, the plate-like member can be heated more uniformly.

An induction heating method of a plate-like member according to one aspect of the present disclosure is an induction heating method of a plate-like member for arranging a plate-like member having a three-dimensional structure in such a way that it is interposed between a pair of plate-like coils and inductively heating the plate-like member, the pair of plate-like coils having a three-dimensional structure that corresponds to the plate-like member and being arranged to be opposed to each other, in which the plate-like member arranged between the pair of plate-like coils includes a plurality of surfaces in a predetermined cross section that is perpendicular to a current that flows through the plate-like coil pair, and each of the coils of the plate-like coil pair is divided into a plurality of turns along the direction in which the current flows for at least each of the plurality of surfaces of the plate-like member.

In the induction heating method of the plate-like member according to one aspect of the present disclosure, the plate-like member arranged between the pair of plate-like coils includes the plurality of surfaces in the predetermined cross section that is perpendicular to the current that flows through the plate-like coil pair, and each of the coils of the plate-like coil pair is divided into a plurality of turns along the direction in which the current flows for at least each of the plurality of surfaces of the plate-like member. Therefore, the currents that flow through each of the coils of the divided plate-like coil pair can be made equal to each other can be made equal to each other, whereby it is possible to uniformly heat the plate-like member.

According to the present disclosure, it is possible to provide an induction heating apparatus and an induction heating method of a plate-like member capable of uniformly heating the plate-like member.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a diagram showing results of a simulation in an induction heating apparatus of a plate-like member according to a comparative example;

DESCRIPTION OF EMBODIMENTS

Hereinafter, specific embodiments employing the present disclosure will be described in detail with reference to the drawings. It should be noted that the present disclosure is not limited to the embodiments described below. For clarity of explanation, the following description and the drawings are simplified as appropriate.

First Embodiment

<Induction Heating Apparatus of Plate-Like Member>

Figure 1:
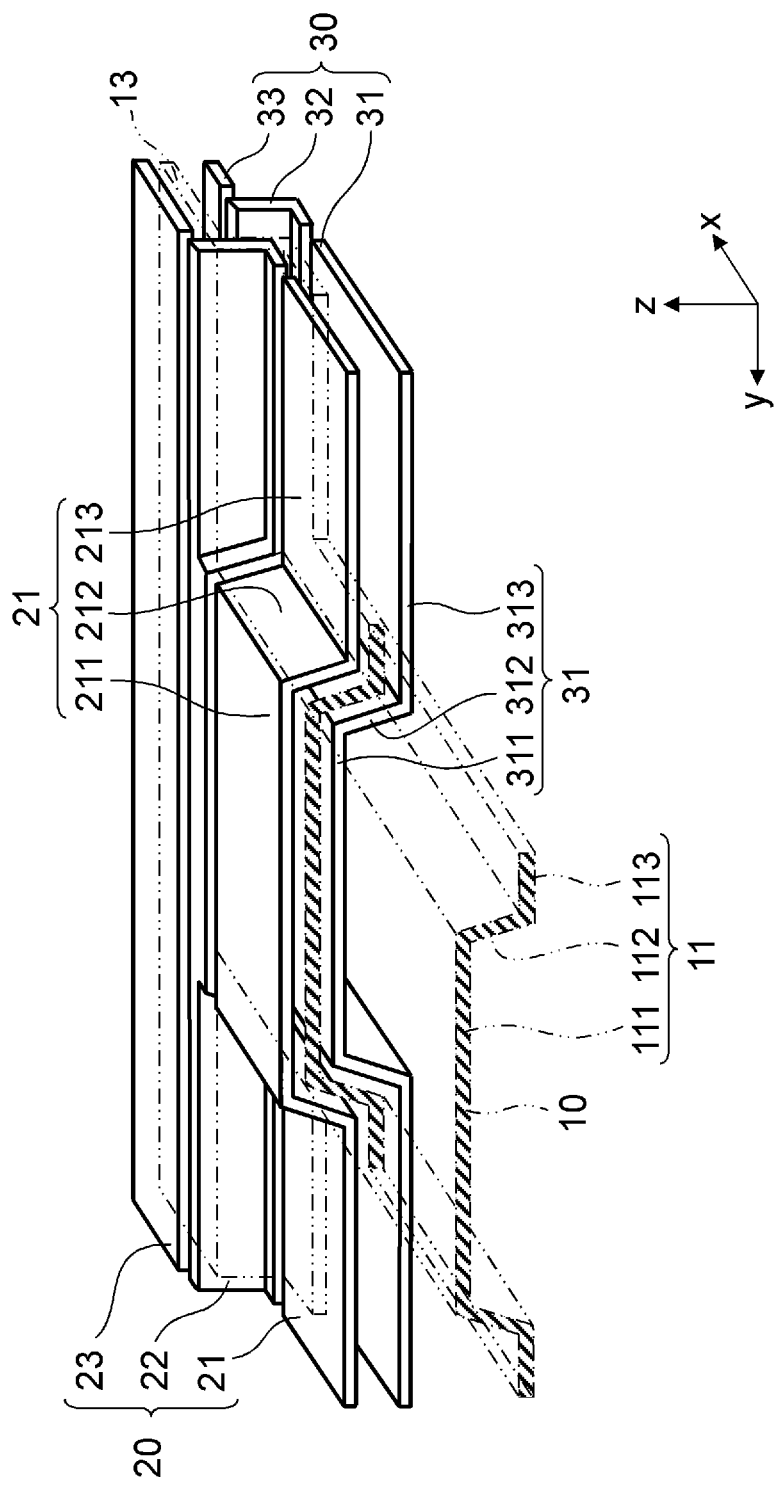
FIG. 1 is a perspective view showing a plate-like coil pair in an induction heating apparatus of a plate-like member according to a first embodiment.
Figure 2:
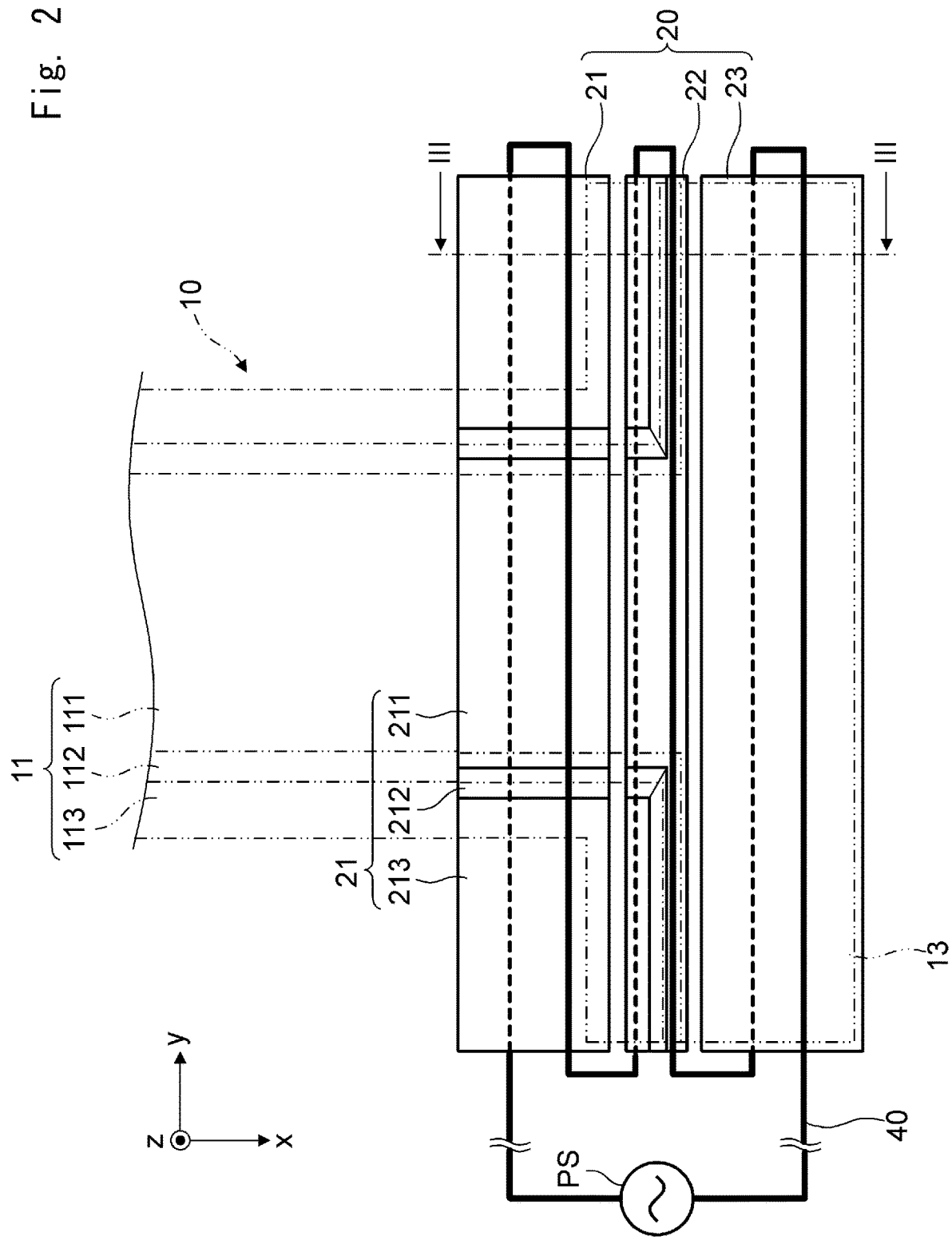
FIG. 2 is a plan view of the induction heating apparatus according to the first embodiment.
Figure 3:
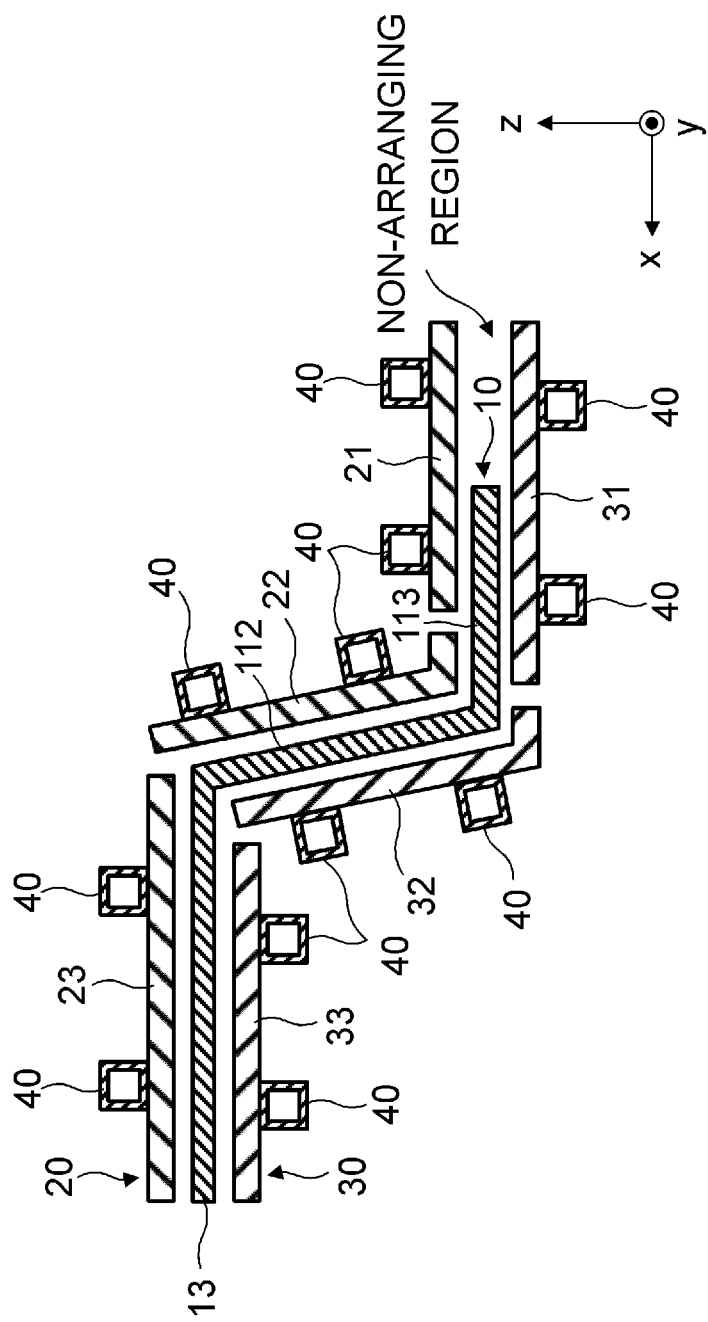
FIG. 3 is a cross-sectional view of FIG. 2 taken along the line III-III.

Referring first to FIGS. 1-3, an induction heating apparatus and an induction heating method of a plate-like member according to a first embodiment will be explained. FIG. 1 is a perspective view showing a plate-like coil pair in an induction heating apparatus of a plate-like member according to the first embodiment. FIG. 2 is a plan view of the induction heating apparatus according to the first embodiment. FIG. 3 is a cross-sectional view of FIG. 2 taken along the line III-III.

As a matter of course, the right-handed xyz Cartesian coordinate system shown in FIG. 1 and other drawings is the one defined to simplify the explanation of the positional relationship among the constituting elements. In general, the z-axis positive direction corresponds to the vertically upward direction and the xy-plane forms a horizontal plane.

The induction heating apparatus of the plate-like member according to this embodiment is suitable as an induction heating apparatus of steel plate members for automobiles where it is required to achieve both high strength and excellent impact absorption characteristics. The induction heating apparatus of the plate-like member according to this embodiment can be used for both quenching and tempering. In the following description, a case in which the induction heating apparatus is used for tempering will be explained.

First, a plate-like member 10 shown by the alternate long and two short dashes lines in FIG. 1 will be explained. The plate-like member 10 is, for example, a steel plate for hot stamping which is made of manganese-boron steel having a thickness of about 1-4 mm, although it is not particularly limited as long as it can be inductively heated. The plate-like member 10 before it is inductively heated is, for example, a hard material having a microstructure, the entire surface of which being made of martensite.

Figure 10:
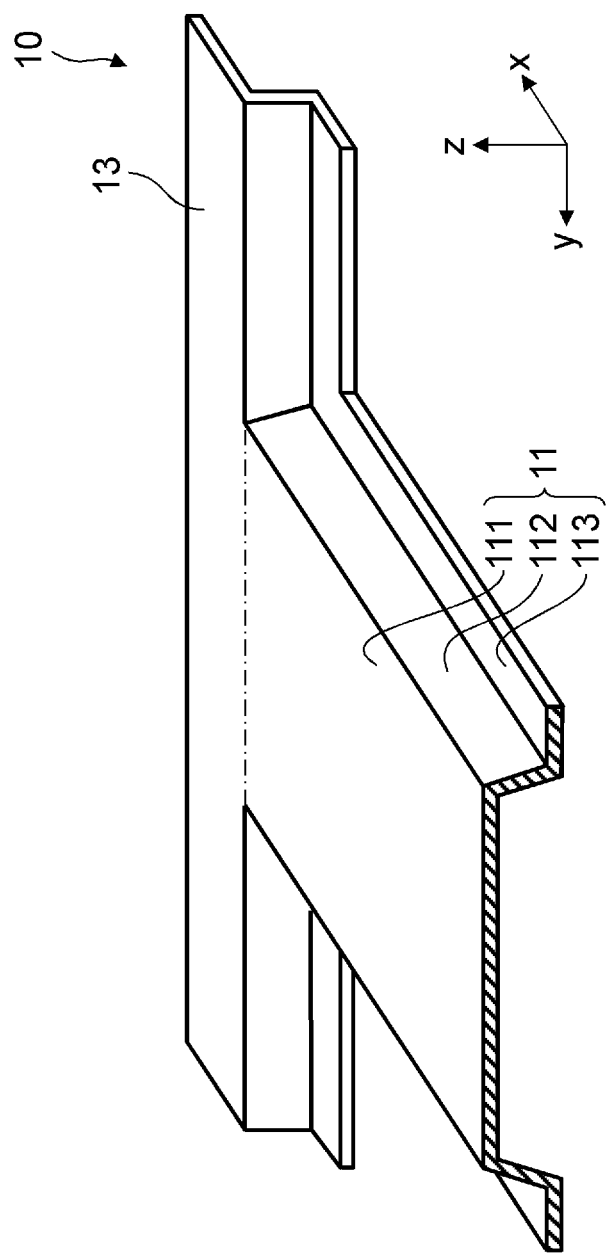
FIG. 10 is a perspective view showing one example of the plate-like member.
Figure 11:
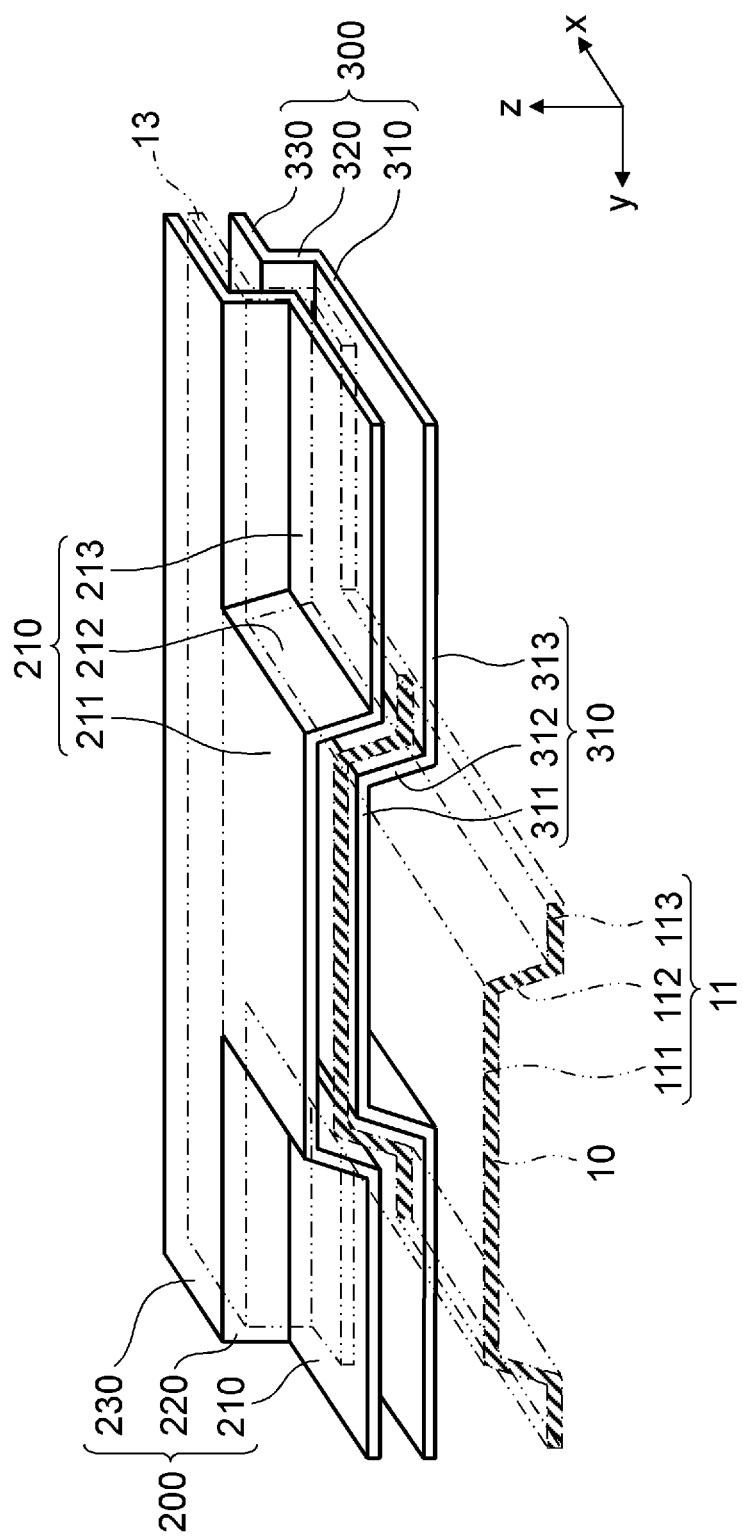
FIG. 11 is a perspective view of a plate-like coil pair which describes the problem solved by the present disclosure.

The plate-like member 10 is the one shown in FIG. 10. As shown in FIG. 10, the plate-like member 10, which is, for example, a part (lower part) of a center pillar reinforcement of an automobile, includes a body part 11 and a lower flange part 13. The alternate long and short dash line shown in FIG. 10 is a boundary line between the body part 11 and the lower flange part 13 that is defined to simplify the explanation. In a state in which the plate-like member 10 is attached to an automobile, the x-axis positive direction side is a lower side and the x-axis negative direction side is an upper side.

As shown in FIG. 10, the body part 11 is a part having a hat-shaped yz cross-section and includes a top plate 111 extending in the x-axis direction, a pair of side walls 112, and flange parts 113. The pair of side walls 112 extend in the z-axis negative direction from the respective ends in the width direction (y direction) of the top plate 111 extending in the x-axis direction. Further, the flange parts 113 project outwardly from the ends of the respective side walls 112.

The lower flange part 13 is a flat plate-shaped part projecting from the end in the x-axis positive direction side of the top plate 111 outwardly in the length direction (x-axis direction) and extending in the width direction (y-axis direction).

The side walls 112 and the flange parts 113 of the body part 11 are extended in the y-axis direction along the lower flange part 13 from the ends of the top plate 111. That is, the side walls 112 and the flange parts 113 of the body part 11 are L-shaped in the xy plan view.

As shown in FIG. 1, the plate-like member 10 has a three-dimensional structure including a plurality of surfaces in a predetermined cross section perpendicular to a current that flows through the plate-like coil pair (the upper plate-like coil 20 and the lower plate-like coil 30) in the y-axis direction. Specifically, as shown in FIG. 3, in the predetermined xz cross section, the plate-like member 10 includes three surfaces formed of the lower flange part 13, the side walls 112, and the flange parts 113, all of which having a flat plate shape.

Note that the intended use and the shape of the plate-like member 10 are not particularly limited.

Next, as shown in FIG. 1, the plate-like coil pair is formed of the upper plate-like coil 20 and the lower plate-like coil 30 having a three-dimensional structure that corresponds to the plate-like member 10. As shown in FIG. 2, the induction heating apparatus according to this embodiment includes, besides the plate-like coil pair (the upper plate-like coil 20 and the lower plate-like coil 30) shown in FIG. 1, a tubular coil 40, and a high frequency power supply PS.

As shown in FIGS. 1-3, each of the coils of the plate-like coil pair (the upper plate-like coil 20 and the lower plate-like coil 30) in the induction heating apparatus of the plate-like member according to this embodiment is divided into a plurality of turns along the direction in which the current flows (y-axis direction) for each of the plurality of surfaces of the plate-like member 10.

In the example shown in the drawings, the upper plate-like coil 20 is divided into three parts, i.e., a hat-like coil 21, a wall-like coil 22, and a flat plate coil 23 for each of the three surfaces of the lower flange part 13, the side walls 112, and the flange parts 113 shown in FIG. 3. In a similar way, the lower plate-like coil 30 is divided into three parts, i.e., a hat-like coil 31, a wall-like coil 32, and a flat plate coil 33 for each of the three surfaces of the lower flange part 13, the side walls 112, and the flange parts 113 shown in FIG. 3.

As shown in FIG. 1, the hat-like coils 21 and 31, which are plate-like coils having a hat-shaped yz cross-section that corresponds to the body part 11 of the plate-like member 10, are arranged to be opposed to each other. The hat-like coil 21 includes a top plate 211 that corresponds to the top plate 111, side walls 212 that corresponds to the side walls 112, and bottom plates 213 that correspond to the flange parts 113. In a similar way, the hat-like coil 31 includes a top plate 311 that corresponds to the top plate 111, side walls 312 that corresponds to the side walls 112, and bottom plates 313 that correspond to the flange parts 113.

As shown in FIG. 1, the wall-like coils 22 and 32, which are plate-like coils having wall parts that correspond to the side walls 112 extending in the y-axis direction along the lower flange part 13 of the plate-like member 10, are arranged to be opposed to each other. The wall-like coil 22 has a structure in which a pair of wall parts extending in the y-axis direction between the bottom plate 213 of the hat-like coil 21 and the flat plate coil 23 are crosslinked by a rod-shaped part extending in the y-axis direction (this corresponds to the top plate 211 of the hat-like coil 21). In a similar way, the wall-like coil 32 has a structure in which a pair of wall parts extending in the y-axis direction between the bottom plate 313 of the hat-like coil 31 and the flat plate coil 33 are crosslinked by a rod-shaped part extending in the y-axis direction (this corresponds to the top plate 311 of the hat-like coil 31).

As shown in FIG. 1, the flat plate coils 23 and 33, which are flat plate-shaped coils that correspond to the lower flange part 13 of the plate-like member 10, are arranged to be opposed to each other.

As shown in FIG. 2, the tubular coil 40 connects the three pairs of plate-like coils that are arranged to be opposed to each other, i.e., the flat plate coils 23 and 33, the wall-like coils 22 and 32, and the hat-like coils 21 and 31 in series in this order. That is, the tubular coil 40, which is joined to outer surfaces of the plate-like coil pair (the upper plate-like coil 20 and the lower plate-like coil 30), each of the coils of the plate-like coil pair being divided into three parts along the direction in which the current flows (y-axis direction), is provided to make a total of three turns, one turn at a time. The respective ends of the tubular coil 40 are connected to the high frequency power supply PS, which forms an open circuit as a whole. Cooling water for cooling the tubular coil 40, the upper plate-like coil 20, and the lower plate-like coil 30 flows inside the tubular coil 40.

The tubular coil 40, which is divided into two coils on the upper surface of the hat-like coil 21, the wall-like coil 22, and the flat plate coil 23 and the lower surface of the hat-like coil 31, the wall-like coil 32, and the flat plate coil 33, is extended in the y-axis direction.

While the tubular coil 40 is drawn by one coil without being divided in order to facilitate understanding in FIG. 2, the tubular coil 40 may not be actually divided.

Further, as shown in FIG. 3, in this embodiment, the tubular coil 40 is a square pipe. Then the tubular coil 40 divided into two coils is joined to the upper surface of the hat-like coil 21, the wall-like coil 22, and the flat plate coil 23 and the lower surface of the hat-like coil 31, the wall-like coil 32, and the flat plate coil 33.

Note that the tubular coil 40 is not limited to a square pipe and may be, for example, a round pipe. Further, the tubular coil 40 may be divided into three or more coils, not into two coils.

Figure 12:
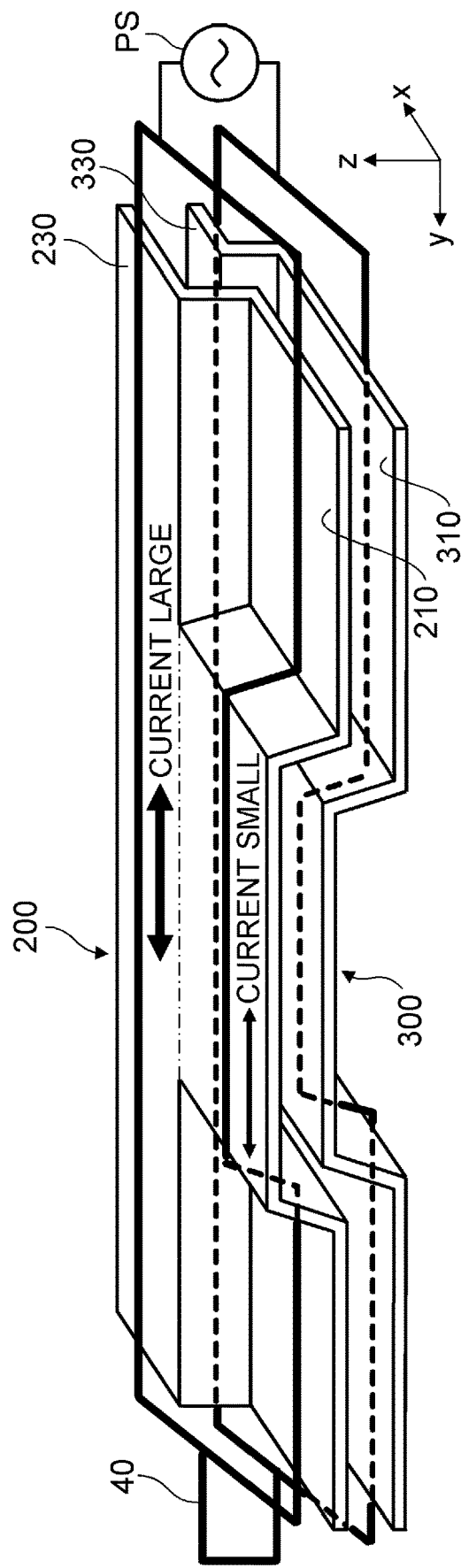
FIG. 12 is a perspective view of the induction heating apparatus which describes the problem solved by the present disclosure.

In the induction heating apparatus shown in FIG. 12, in the upper plate-like coil 200 and the lower plate-like coil 300, the cross-sectional length that is parallel to the current that flows in the y-axis direction varies depending on the position of the x-axis direction. For example, since the cross-sectional length of the hat-shaped parts 210 and 310 is longer than that of the flat plate parts 230 and 330, the resistance in the hat-shaped parts 210 and 310 becomes larger than that in the flat plate parts 230 and 330. Therefore, there is a problem that, as shown in FIG. 12, currents concentrate in a region whose resistance is small (e.g., the flat plate parts 230 and 330) in each of the upper plate-like coil 200 and the lower plate-like coil 300, whereby the plate-like member 10 cannot be heated uniformly.

On the other hand, in the induction heating apparatus of the plate-like member according to this embodiment, each of the coils of the plate-like coil pair (the upper plate-like coil 20 and the lower plate-like coil 30) is divided into a plurality of turns along the direction in which the current flows (y-axis direction) for each of the plurality of surfaces of the plate-like member 10. As described above, the flat plate coils 23 and 33, the wall-like coils 22 and 32, and the hat-like coils 21 and 31 are connected in series by the tubular coil 40. Therefore, the current that flows through the flat plate coils 23 and 33, the current that flows through the wall-like coils 22 and 32, and the current that flows through the hat-like coils 21 and 31 can be made equal to one another, whereby the entire plate-like member 10 can be heated uniformly.

Further, regarding the hat-like coils 21 and 31, the cross-sectional length that is parallel to the current that flows in the y-axis direction does not change regardless of the position of the x-axis direction and is constant. Therefore, the resistance becomes constant regardless of the position of the x-axis direction in each of the hat-like coils 21 and 31, whereby it is possible to uniformly heat the whole region of the plate-like member 10 interposed between the hat-like coils 21 and 31.

Further, regarding the flat plate coils 23 and 33 as well, the cross-sectional length that is parallel to the current that flows in the y-axis direction does not change regardless of the position of the x-axis direction and is constant. Therefore, the resistance becomes constant regardless of the position of the x-axis direction in each of the flat plate coils 23 and 33, whereby it is possible to uniformly heat the whole region of the plate-like member 10 interposed between the flat plate coils 23 and 33.

Further, as described above, the current that flows through the flat plate coils 23 and 33 is equal to the current that flows through the hat-like coils 21 and 31. Therefore, the heating temperature of the region of the plate-like member 10 interposed between the flat plate coils 23 and 33 can be made equal to the heating temperature of the region of the plate-like member 10 interposed between the hat-like coils 21 and 31.

Regarding the wall-like coils 22 and 32, the cross-sectional length that is parallel to the current that flows in the y-axis direction varies depending on the position of the width direction. However, since the widths of the wall-like coils 22 and 32 are narrow, the whole region of the plate-like member 10 interposed between the wall-like coils 22 and 32 can be heated substantially uniformly.

Further, as described above, the current that flows through the wall-like coils 22 and 32 is equal to the current that flows through the hat-like coils 21 and 31 and the flat plate coils 23 and 33. Therefore, the heating temperature of the region of the plate-like member 10 interposed between the wall-like coils 22 and 32 can be made equal to the heating temperature of the region of the plate-like member 10 interposed between the hat-like coils 21 and 31 and the flat plate coils 23 and 33.

Further, the wall-like coils 22 and 32 are located between the hat-like coils 21 and 31 and the flat plate coils 23 and 33. As described above, the heating temperature of the region of the plate-like member 10 interposed between the flat plate coils 23 and 33 is equal to the heating temperature of the region of the plate-like member 10 interposed between the hat-like coils 21 and 31. Therefore, the heating temperature of the region of the plate-like member 10 interposed between the wall-like coils 22 and 32 tends to be equal to the heating temperature of the region of the plate-like member 10 interposed between the hat-like coils 21 and 31 and the flat plate coils 23 and 33.

Second Embodiment

<Induction Heating Apparatus of Plate-Like Member>

Figure 4:
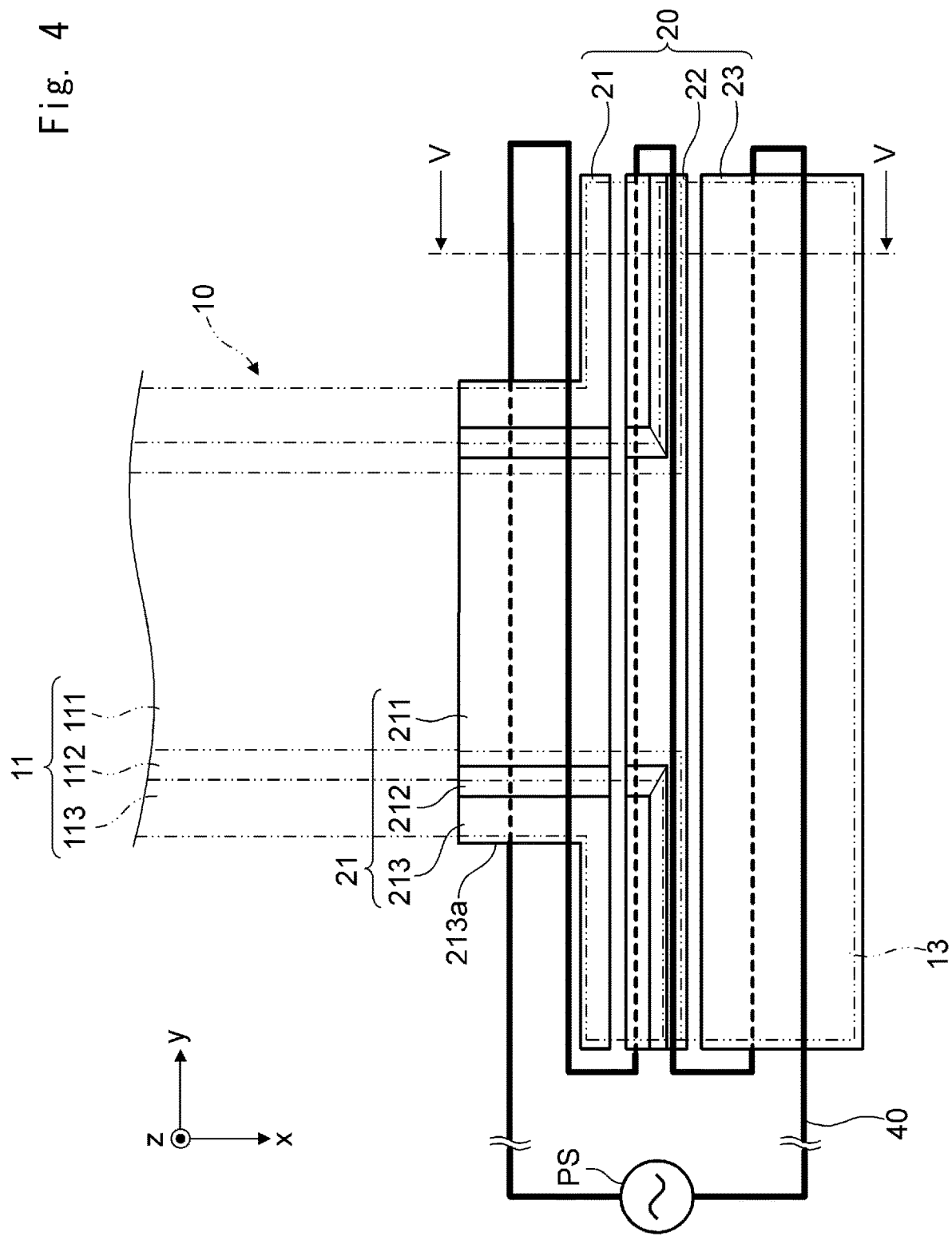
FIG. 4 is a plan view of an induction heating apparatus according to a second embodiment.
Figure 5:
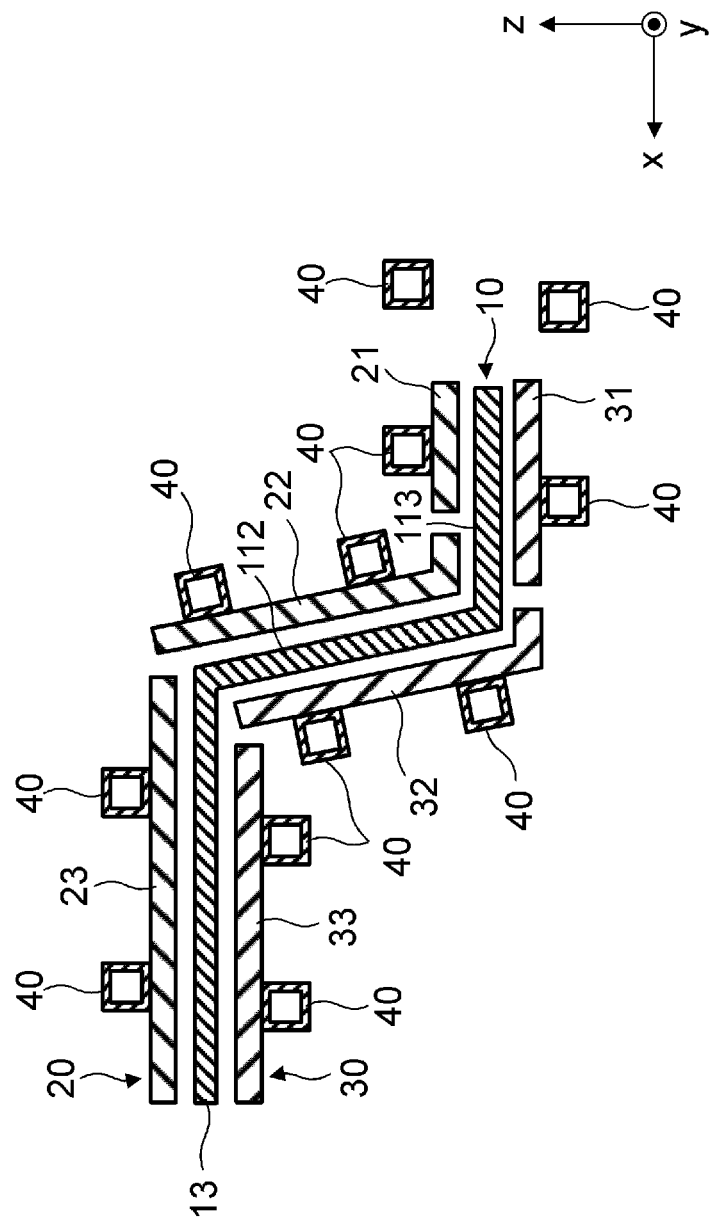
FIG. 5 is a cross-sectional view of FIG. 4 taken along the line V-V.

Referring first to FIGS. 4 and 5, an induction heating apparatus of a plate-like member according to a second embodiment will be explained. FIG. 4 is a plan view of the induction heating apparatus according to the second embodiment. FIG. 5 is a cross-sectional view of FIG. 4 taken along the line V-V.

As shown in FIG. 4, in the induction heating apparatus according to the second embodiment, the upper plate-like coil 20 and the lower plate-like coil 30 are formed in such a way that the outer forms of the upper plate-like coil 20 and the lower plate-like coil 30 in the xy plan view overlap the outer form of the plate-like member 10. Specifically, as shown in FIG. 4, a cut-out part 213a is formed in the bottom plate 213 of the hat-like coil 21 in accordance with the outer form of the plate-like member 10. A cut-out part (not shown) is formed also in the bottom plate 313 of the hat-like coil 31.

In the induction heating apparatus of the plate-like member according to the first embodiment, as shown in FIG. 3, a non-arranging region, which is a region in which the plate-like member 10 is not arranged between the hat-like coils 21 and 31, is formed. The resistance inside the hat-like coils 21 and 31 in the non-arranging region is different from that in the arranging region where the plate-like member 10 is arranged. Specifically, the resistance becomes high in the arranging region due to a demagnetizing field from the plate-like member 10, whereas the influence of the demagnetizing field from the plate-like member 10 is small in the non-arranging region. Therefore, the resistance becomes smaller in the non-arranging region than that in the arranging region in the hat-like coils 21 and 31, and currents tend to concentrate in the non-arranging region.

On the other hand, in the induction heating apparatus of the plate-like member according to the second embodiment, as shown in FIG. 5, the plate-like member 10 is arranged in the entire part between the hat-like coils 21 and 31. That is, the non-arranging region, which is a region where the plate-like member 10 is not arranged between the hat-like coils 21 and 31, is not formed. As a result, currents no longer concentrate in the non-arranging region, whereby the plate-like member 10 can be heated uniformly between the hat-like coils 21 and 31.

Further, similar to the induction heating apparatus according to the first embodiment, the tubular coil 40 is divided into two coils on the upper surface of the hat-like coil 21, the wall-like coil 22, and the flat plate coil 23 and the lower surface of the hat-like coil 31, the wall-like coil 32, and the flat plate coil 33, and is extended in the y-axis direction.

In FIG. 4, for the sake of facilitating understanding, the tubular coil 40 is drawn by one line without being divided.

Further, as shown in FIG. 5, in this embodiment, the tubular coil 40 is a square pipe. The tubular coil 40 divided into two coils is joined to the upper surface of the hat-like coil 21, the wall-like coil 22, and the flat plate coil 23 and the lower surface of the hat-like coil 31, the wall-like coil 32, and the flat plate coil 33.

The tubular coil 40 is not limited to the square pipe and may be, for example, a round pipe. Further, the tubular coil 40 may be divided into three or more coils, not into two coils.

Figure 6:
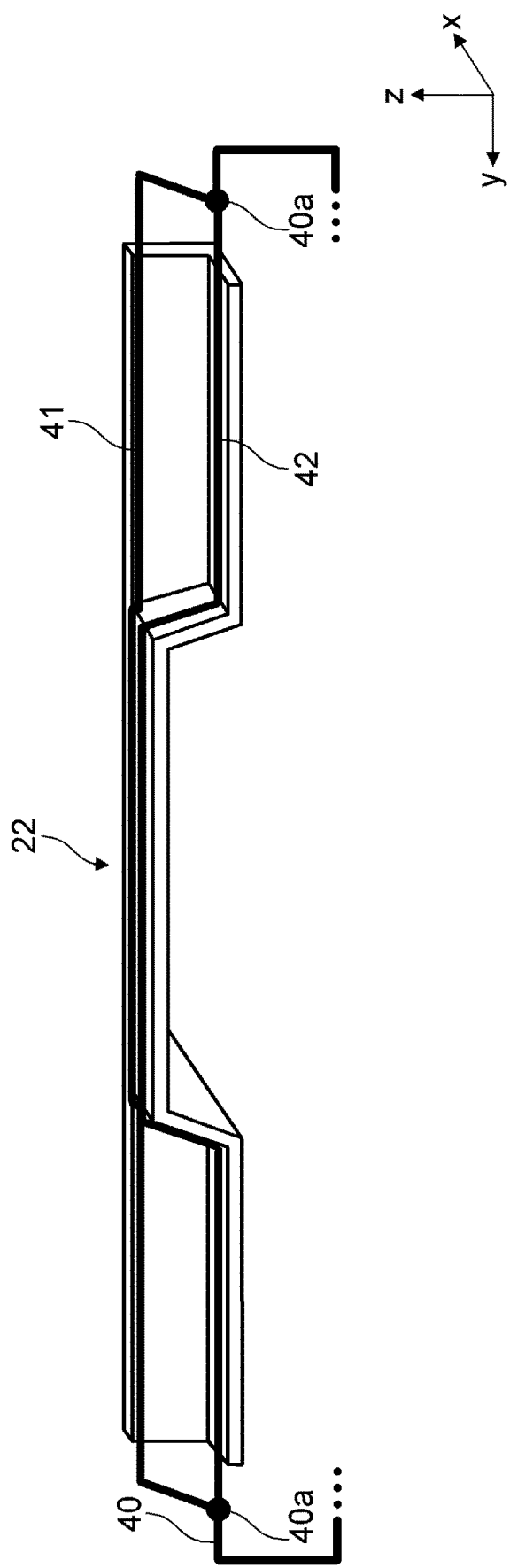
FIG. 6 is a perspective view of a wall-like coil 22 in the induction heating apparatus of a plate-like member according to the second embodiment.

FIG. 6 is a perspective view of the wall-like coil 22 in the induction heating apparatus of the plate-like member according to the second embodiment. As shown in FIG. 6, in the induction heating apparatus according to the second embodiment, the tubular coil 40 is joined to the wall-like coil 22 in such a manner that it is divided into a first branch part 41 and a second branch part 42. The tubular coil 40 is divided into the first branch part 41 and the second branch part 42 between two branch points 40a.

As shown in FIG. 6, the first branch part 41 is formed in a straight line, whereas the second branch part 42 is formed in such a way that it is bent to be a hat shape. Therefore, the length of the part joined to the wall-like coil 22 in the first branch part 41 is shorter than that in the second branch part 42. If the length of the part protruded from the wall-like coil 22 in the first branch part 41 and that in the second branch part 42 are equal to each other, the total length of the first branch part 41 becomes shorter than the total length of the second branch part 42. Therefore, the resistance of the first branch part 41 becomes smaller than that of the second branch part 42, and currents are likely to flow through the first branch part 41 more than they flow through the second branch part 42. Therefore, the part in the vicinity of the first branch part 41 is likely to be heated in the wall-like coil 22.

As shown in FIG. 6, in this embodiment, the part that is protruded from the wall-like coil 22 in the first branch part 41 is longer than that in the second branch part 42. That is, the length of the part that is protruded from the wall-like coil 22 in each of the first branch part 41 and the second branch part 42 is adjusted in such a way that the total length of the first branch part 41 becomes equal to the total length of the second branch part 42. Therefore, the resistance of the first branch part 41 becomes substantially equal to that of the second branch part 42, and the current that flows through the first branch part 41 becomes substantially equal to the current that flows through the second branch part 42. It is therefore possible to heat the wall-like coil 22 more uniformly.

Since the other configurations are similar to those of the first embodiment, the descriptions thereof will be omitted.

<Specific Example of Plate-Like Member>

Figure 7:
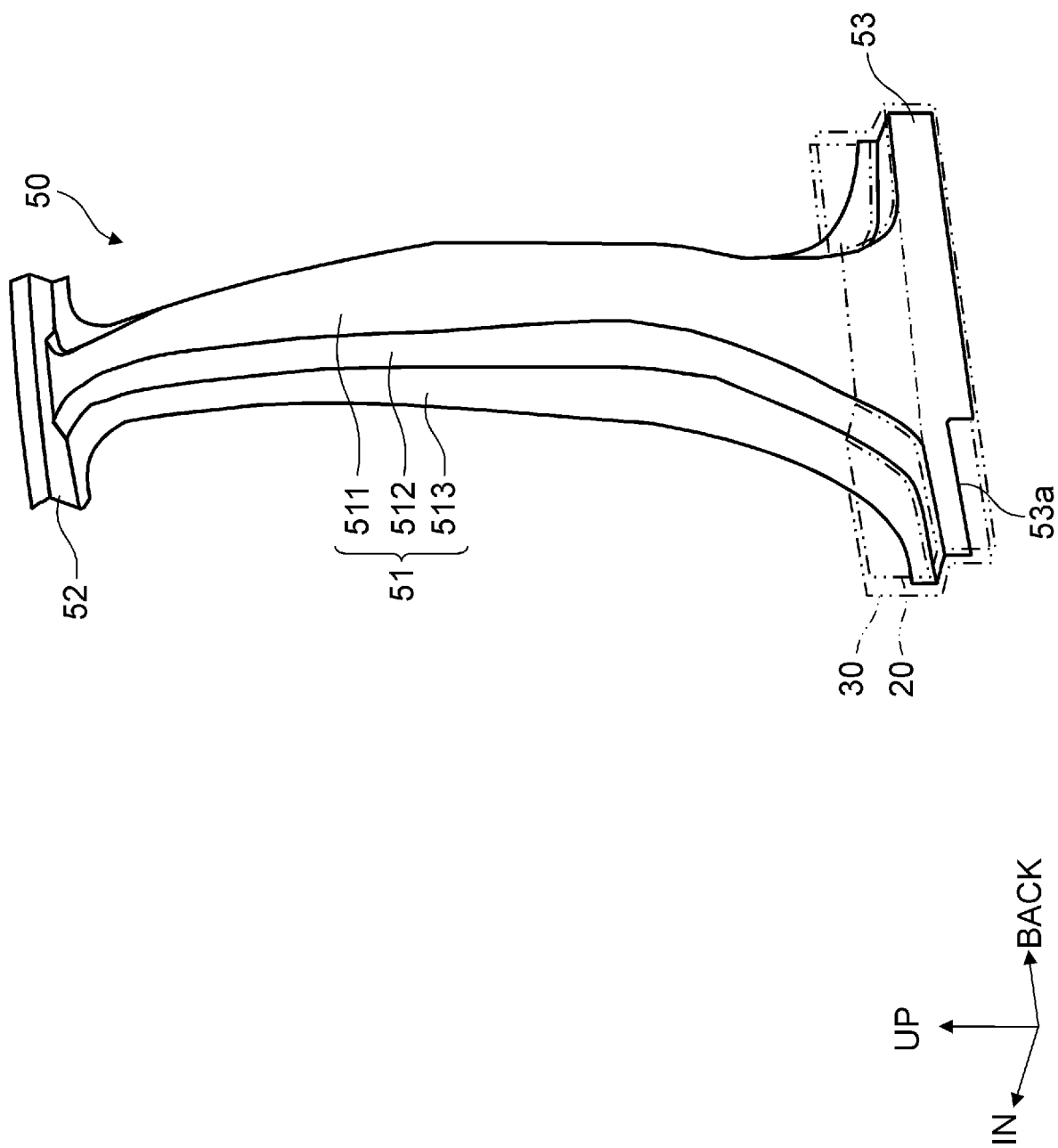
FIG. 7 is a perspective view showing one example of the plate-like member.

Next, with reference to FIG. 7, a configuration of a specific example of the plate-like member to be heated using the induction heating apparatus of the plate-like member according to the embodiment will be explained. FIG. 7 is a perspective view showing one example of the plate-like member. A plate-like member 50 shown in FIG. 7 is a plate-like member for a pillar, which is a member for a vehicle, and more specifically, a center pillar reinforcement. The arrows shown in FIG. 7 indicate the respective directions in a vehicle.

As shown in FIG. 7, the plate-like member 50 includes a body part 51, an upper flange part 52, and a lower flange part 53.

The intended use and the shape of the plate-like member 50 shown in FIG. 7 are only illustrative, and the intended use and the shape of the plate-like member that will be applied to the induction heating apparatus of the plate-like member according to this embodiment are not particularly limited.

As shown in FIG. 7, the body part 51 is a part having a hat-shaped cross-section and includes a top plate 511, a side walls 512, and flange parts 513 that are extended in the vertical direction. More specifically, the pair of side walls 512 are inwardly formed from the ends in the width direction of the top plate 511 extending in the vertical direction. Further, the flange parts 513 project outwardly from the ends of the respective side walls 512.

Further, the body part 51 is slightly curved such that the body part 51 bulges outside as a whole. Additionally, the upper end part and the lower end part of the body part 51 are widened in the width direction (front-back direction) and are T-shaped in a plan view. The degree of widening in the width direction (front-back direction) is greater in the lower end part than that in the upper end part.

The upper flange part 52 includes a plate surface extending outwardly and perpendicularly from the upper end part of the body part 51 and a plate surface projecting from the end on the outer side of the above plate surface in the upper direction (outer side in the length direction of the body part 51). That is, the upper flange part 52 is a part having an L-shaped cross section extending in the width direction (front-back direction).

The lower flange part 53 is a flat plate-shaped part projecting from the lower end part of the top plate 511 in the lower side (outer side in the length direction) and extending in the width direction (front-back direction). A cut-out part 53a is provided in the lower side of the lower flange part 53.

FIG. 7 shows a plate-like coil pair (the upper plate-like coil 20 and the lower plate-like coil 30) to be used for tempering the plate-like member 50 by the alternate long and two short dashes lines. In the plate-like member 50, the lower flange part 53 and the lower part of the body part 51 positioned between the upper plate-like coil 20 and the lower plate-like coil 30 are a soft region. The other region is a hard region.

<Results of Simulation>

Figure 9:
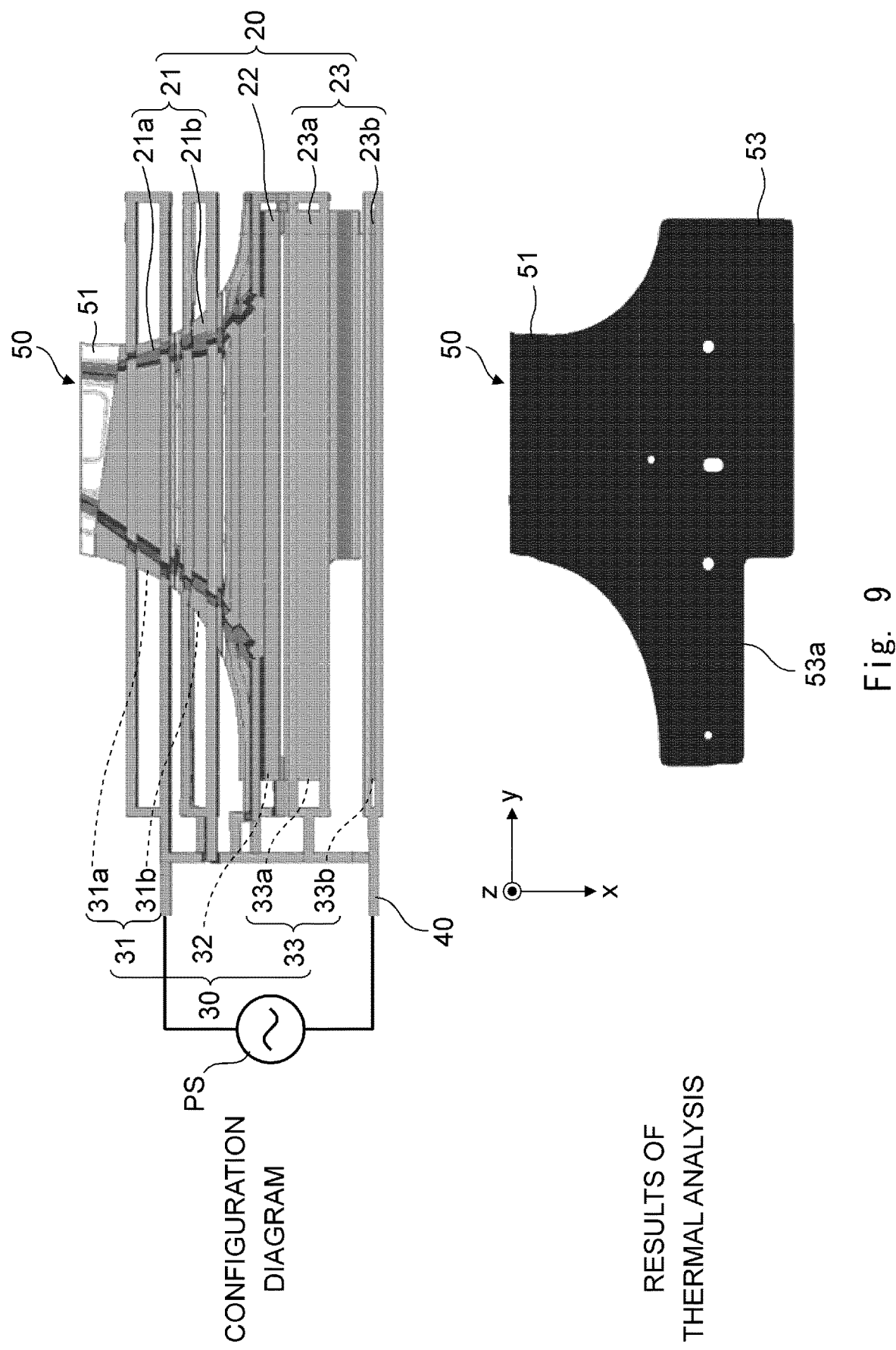
FIG. 9 is a diagram showing results of a simulation in an induction heating apparatus of a plate-like member according to an Example of the second embodiment.

Next, with reference to FIGS. 8 and 9, results of a thermal analysis simulation obtained by inductively heating the plate-like member 50 shown in FIG. 7 will be explained. FIG. 8 is a diagram showing results of a simulation in an induction heating apparatus of a plate-like member according to a comparative example. FIG. 9 is a diagram showing results of a simulation in an induction heating apparatus of a plate-like member according to an Example of the second embodiment. The upper stages in FIG. 8 and FIG. 9 show the configuration diagram according to the comparative example and that according to the Example, respectively. The lower stages in FIGS. 8 and 9 show the results of the thermal analysis according to the comparative example and those according to the Example, respectively.

As shown in the upper stage of FIG. 8, in the thermal analysis simulation according to the comparative example, an upper plate-like coil 200 is formed of three plate-like coils, i.e., a hat-like coil 210a, an intermediate coil 220a, and a flat plate coil 230a extending in the y-axis direction. A lower plate-like coil 300 is also formed of three plate-like coils, i.e., a hat-like coil 310a, an intermediate coil 320a, and a flat plate coil 330a extending in the y-axis direction.

The tubular coil 40 is a copper tube that connects the hat-like coil 210a, the hat-like coil 310a, the intermediate coil 220a, the intermediate coil 320a, the flat plate coil 230a, and the flat plate coil 330a, which are the three pairs of plate-like coils, in this order. That is, the tubular coil 40 is provided in such a way that it makes three turns outside the three pairs of plate-like coils. That is, the tubular coil 40 forms a three turn coil along with the plate-like coil pair (the upper plate-like coil 200 and the lower plate-like coil 300), each of which being divided into three parts. The respective ends of the tubular coil 40 are connected to the high frequency power supply PS, which forms an open circuit as a whole.

As described above, each of the coils of the plate-like coil pair (the upper plate-like coil 200 and the lower plate-like coil 300) according to the comparative example is divided into three turns along the direction in which the current flows (y-axis direction). However, each of the coils of the plate-like coil pair (the upper plate-like coil 200 and the lower plate-like coil 300) according to the comparative example is not divided for each of the plurality of surfaces of the plate-like member 50. Specifically, the intermediate coils 220a and 320a are formed across the three surfaces from the body part 51 to the lower flange part 53. Therefore, as shown in the lower stage shown in FIG. 8, the plate-like member 50 cannot be heated uniformly.

On the other hand, as shown in the upper stage of FIG. 9, in the thermal analysis simulation according to the Example, the upper plate-like coil 20 is divided into the hat-like coil 21, the wall-like coil 22, and the flat plate coil 23 extending in the y-axis direction for each of the plurality of surfaces of the plate-like member 50. Further, the hat-like coil 21 is divided into two hat-like coils 21a and 21b. Further, the flat plate coil 23 is also divided into two flat plate coils 23a and 23b. That is, the upper plate-like coil 20 is divided into five parts along the direction in which the current flows (y-axis direction).

The lower plate-like coil 30 is also divided into the hat-like coil 31, the wall-like coil 32, and the flat plate coil 33 extending in the y-axis direction for each of the plurality of surfaces of the plate-like member 50. Further, the hat-like coil 31 is divided into two hat-like coils 31a and 31b. Further, the flat plate coil 33 is also divided into two flat plate coils 33a and 33b. That is, the lower plate-like coil 30 is divided into five parts along the direction in which the current flows (y-axis direction).

The tubular coil 40 is a copper tube that connects in series the hat-like coils 21a and 31a, the hat-like coils 21b and 31b, the wall-like coils 22 and 32, the flat plate coils 23a and 33a, and the flat plate coils 23b and 33b, which are five pairs of plate-like coils in this order. That is, the tubular coil 40 is provided to make five turns outside the five pairs of plate-like coils. That is, the tubular coil 40 forms a five turn coil along with the plate-like coil pair (the upper plate-like coil 20 and the lower plate-like coil 30), each of which being divided into five parts. The respective ends of the tubular coil 40 are connected to the high frequency power supply PS, which forms an open circuit as a whole.

Further, the tubular coil 40 is divided into two coils on the upper surface of the hat-like coils 21a and 21b, the wall-like coil 22, and the flat plate coils 23a and 23b and the lower surface of the hat-like coils 31a and 31b, the wall-like coil 32, and the flat plate coils 33a and 33b, and are extended in the y-axis direction. In the Example, the total lengths of the branch parts of the tubular coil 40 divided into two coils are adjusted to be equal to each other in each of the divided plate-like coils.

Further, in the Example, the upper plate-like coil 20 and the lower plate-like coil 30 are formed in such a way that the outer forms of the upper plate-like coil 20 and the lower plate-like coil 30 in the xy plan view overlap the outer form of the plate-like member 50.

As described above, each of the coils of the plate-like coil pair (the upper plate-like coil 20 and the lower plate-like coil 30) according to the Example is divided along the direction in which the current flows (y-axis direction) for each of the plurality of surfaces of the plate-like member 50. Therefore, as shown in the lower stage of FIG. 9, the entire plate-like member 50 can be heated uniformly. Further, each of the coils of the plate-like coil pair (the upper plate-like coil 20 and the lower plate-like coil 30) shown in FIG. 1 is divided into three turns. On the other hand, each of the coils of the plate-like coil pair (the upper plate-like coil 20 and the lower plate-like coil 30) according to the Example shown in FIG. 9 is divided into five turns. Therefore, the areas of the respective turns can be made more uniform, whereby the entire plate-like member 50 can be heated more uniformly.

As described above, the effects of the induction heating apparatus of the plate-like member according to this embodiment have been confirmed by the thermal analysis simulation.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An induction heating apparatus of a plate-like member for arranging a plate-like member having a three-dimensional structure in such a way that it is interposed between a pair of plate-like coils and inductively heating the plate-like member, the pair of plate-like coils having a three-dimensional structure that corresponds to the plate-like member and being arranged to be opposed to each other, wherein
    the plate-like member arranged between the pair of plate-like coils includes a plurality of surfaces in a predetermined cross section that is perpendicular to a current that flows through the plate-like coil pair,
    each of the coils of the plate-like coil pair is divided into a plurality of turns along the direction in which the current flows for at least each of the plurality of surfaces of the plate-like member,
    a tubular coil is joined to respective outer surfaces of the divided plate-like coil pair and connects the divided plate-like coil pair in series,
    the tubular coil is joined to at least one of the plate-like coils that form the divided plate-like coil pair in such a manner that the tubular coil is divided into first and second branch parts, and
    the length of a part joined to the plate-like coil in the first branch part is shorter than that in the second branch part and the length of a part protruded from the plate-like coil in the first branch part is longer than that in the second branch part.

2. The induction heating apparatus of the plate-like member according to claim 1, wherein the plate-like coil pair is formed in such a way that the outer form thereof overlaps that of the plate-like member in a plane view.

3. An induction heating method of a plate-like member comprising:
    arranging a plate-like member having a three-dimensional structure in such a way that it is interposed between a pair of plate-like coils; and
    inductively heating the plate-like member, wherein
    the pair of plate-like coils have a three-dimensional structure that corresponds to the plate-like member and are arranged to be opposed to each other,
    the plate-like member arranged between the pair of plate-like coils includes a plurality of surfaces in a predetermined cross section that is perpendicular to a current that flows through the plate-like coil pair,
    each of the coils of the plate-like coil pair is divided into a plurality of turns along the direction in which the current flows for at least each of the plurality of surfaces of the plate-like member,
    a tubular coil is joined to respective outer surfaces of the divided plate-like coil pair and connects the divided plate-like coil pair in series,
    the tubular coil is joined to at least one of the plate-like coils that form the divided plate-like coil pair in such a manner that the tubular coil is divided into first and second branch parts, and
    the length of a part joined to the plate-like coil in the first branch part is shorter than that in the second branch part and the length of a part protruded from the plate-like coil in the first branch part is longer than that in the second branch part.

* * * * *